No. 661,584. Patented Nov. 13, 1900.
W. K. OMICK.
STORAGE AIR BRAKE SYSTEM.
(Application filed July 3, 1899.)
(No Model.)

Witnesses:
G. S. Noble
J. Buehler

Inventor,
William K Omick
By Ludington + Jones,
Att'ys.

UNITED STATES PATENT OFFICE.

WILLIAM K. OMICK, OF PONTIAC, MICHIGAN, ASSIGNOR TO THE G. P. MAGANN AIR BRAKE COMPANY, OF DETROIT, MICHIGAN.

STORAGE AIR-BRAKE SYSTEM.

SPECIFICATION forming part of Letters Patent No. 661,584, dated November 13, 1900.

Application filed July 3, 1899. Serial No. 722,637. (No model.)

*To all whom it may concern:*

Be it known that I, WILLIAM K. OMICK, a citizen of the United States, residing at Pontiac, in the county of Oakland and State of Michigan, have invented a certain new and useful Improvement in Storage Air-Brake Systems, of which the following is a full, clear, concise, and exact description, reference being had to the accompanying drawings, forming a part of this specification.

My invention relates to a storage air-brake system, my object being to provide an improved construction of air-brake, whereby the brake mechanism of a vehicle may be readily controlled through the agency of compressed air.

In accordance with the present invention I provide a main reservoir having associated therewith a suitable coupling device whereby the same may be connected with a source of air-supply, and I connect the main reservoir with an auxiliary reservoir through a reducing-valve, which serves to reduce the pressure from about three hundred pounds in the main reservoir to about fifty pounds in the auxiliary reservoir. The auxiliary reservoir is connected with the air-brake cylinder, which is provided with two pistons, the air being admitted to the space between the two pistons and springs being provided which serve to yieldingly press the pistons toward each other. A manual valve is interposed in the pipe, extending between the auxiliary reservoir and the air-brake cylinder, the manual valve in one position serving to connect the auxiliary reservoir and the brake-cylinder, while in the other position it seals the auxiliary reservoir and connects the brake-cylinder with the atmosphere. When the brake-cylinder is in communication with the auxiliary reservoir, the pistons are separated, and when the valve is moved to the alternative position the air in the brake-cylinder is permitted to escape and the springs return the pistons to their initial position. Either movement of the pistons may be used for setting the brakes. Thus the separation of the pistons by air-pressure may be used for setting the brakes, while the recoil of the springs serves to release the brakes, or vice versa.

I have illustrated my invention in the accompanying drawings, in which—

Figure 1:
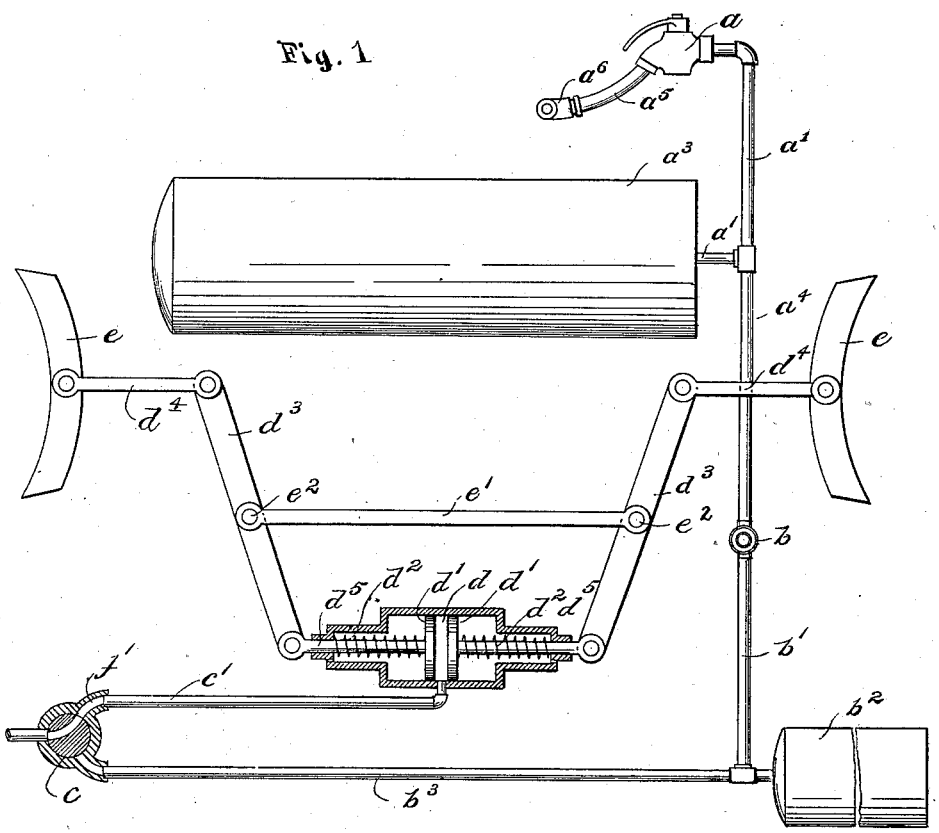
Figure 2:
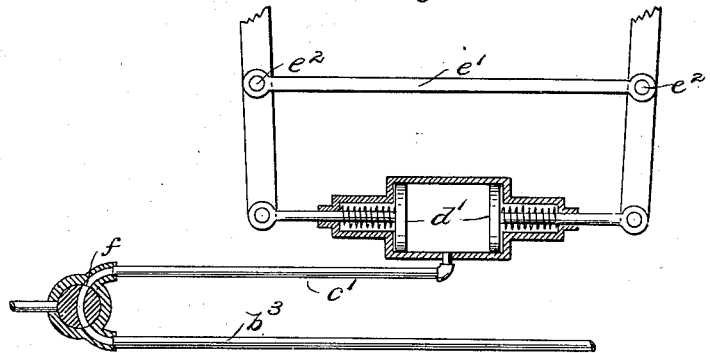

Figure 1 is a view showing the brakes released. Fig. 2 is a view showing the brakes set.

Like letters refer to like parts in both figures.

The pipe $a'$, mounted on the vehicle, is connected with the valve $a$, a flexible tube $a^5$, and a coupling $a^6$, whereby the pipe $a'$ may be connected with any convenient source of compressed air, as a tank or compressor, located along the pathway of the vehicle. The pipe $a'$ extends to the storage tank or reservoir $a^3$, and from this reservoir the pipe $a^4$ extends through a reducing-valve $b$ and the pipe $b'$ to the auxiliary reservoir $b^2$, which has a pipe $b^3$ leading through the three-way controlling or motorman's valve $c$ and thence through pipe $c'$ to the brake-cylinder $d$. The three-way valve is shown in Fig. 1 in position to connect the pipe $c$ with the atmosphere, the pipe $c^3$ being disconnected, while in Fig. 2 the pipes $b^3$ and $c'$ are shown as connected together with the three-way valve.

Within the brake-cylinder $d$ are the pistons $d\ d'$, adapted to be pressed toward each other by the coiled springs $d^2$, encircling the piston-rods $d^5\ d^5$, the ends of which are pivoted, respectively, to the arms or levers $d^3\ d^3$, the opposite ends of which arms are connected by links $d^4\ d^4$ of the draft-circles $e\ e$, connected to the brake-shoes in any suitable manner. The arms $d^3$ are connected together by a link $e'$, pivoted to the arms at $e^2\ e^2$, these pivots serving as the fulcrums about which the arms are adapted to be rotated.

Normally the controlling-valve occupies the position shown in Fig. 1, in which the pipes $b^3$ and $c'$ are disconnected and the pipe $c'$ is connected with the atmosphere. The springs press the pistons toward each other and retract the brake-shoes. When it is desired to throw on the brakes, the controlling-valve is moved to the position shown in Fig. 2, in which case the pipe $c'$ is connected with the pipe $b^3$ and the air from the auxiliary reservoir passes to the cylinder $d$ to press the pistons apart and throw on the brakes. The motorman by manipulating the controlling-valve is thus enabled to throw the brakes on and off at will. The air-supply to the main reservoir is preferably employed at a pressure of about three hundred pounds, and the reducing-valve $b$ serves to reduce the pressure in the auxiliary reservoir and the working pipes to about fifty pounds pressure.

Instead of compressed air liquefied air may be employed in the storage-reservoirs.

Having described my invention, what I claim as new, and desire to secure by Letters Patent, is—

In a storage air-brake system, the combination with a main reservoir and a coupling device associated therewith for connecting the main reservoir with a source of air-supply, of an auxiliary reservoir connected with the main reservoir, a reducing-valve interposed between the same, an air-brake cylinder, a pair of pistons therein yieldingly pressed toward each other, a pipe extending between the auxiliary reservoir and the air-brake cylinder at a point between said pistons, suitable connections between said pistons and the brake-shoes and a manually-operated valve interposed in the pipe extending between said auxiliary reservoir and the brake-cylinder and adapted in one position to maintain the communication between the auxiliary reservoir and the air-brake cylinder and in the other position to seal the auxiliary reservoir and connect the air-brake cylinder with the atmosphere, substantially as described.

In witness whereof I have hereunto subscribed my name in the presence of two witnesses.

WILLIAM K. OMICK.

Witnesses:
 AVIS L. VOORHEIS,
 WILLIAM C. DUFFEE.